(12) United States Patent
Song et al.

(10) Patent No.: US 8,319,363 B2
(45) Date of Patent: Nov. 27, 2012

(54) WIND POWER GENERATOR

(75) Inventors: Sung-Ho Song, Suwon (KR); Man-Soo Choi, Suwon (KR); Pil-Joo Lim, Suwon (KR)

(73) Assignee: DMS Co., Ltd., Suwon (KR)

( * ) Notice: Subject to any disclaimer, the term of this patent is extended or adjusted under 35 U.S.C. 154(b) by 361 days.

(21) Appl. No.: 12/713,453

(22) Filed: Feb. 26, 2010

(65) Prior Publication Data

US 2010/0253086 A1 Oct. 7, 2010

(30) Foreign Application Priority Data

Apr. 3, 2009 (KR) .................. 10-2009-0028984

(51) Int. Cl.
*F03D 9/00* (2006.01)
*H02P 9/04* (2006.01)
(52) U.S. Cl. ........................................ 290/44
(58) Field of Classification Search .................. 290/44, 290/55

See application file for complete search history.

(56) References Cited

U.S. PATENT DOCUMENTS

| 6,408,575 B1 * | 6/2002 | Yoshida et al. ............ 52/40 |
| 7,895,744 B2 * | 3/2011 | Numajiri ................ 29/889.1 |
| 8,083,212 B2 * | 12/2011 | Numajiri et al. ........... 254/278 |
| 2010/0028152 A1 * | 2/2010 | Numajiri et al. ........ 416/146 R |
| 2010/0164232 A1 * | 7/2010 | Siegfriedsen ............... 290/55 |

FOREIGN PATENT DOCUMENTS

| JP | 2006-152862 A | 6/2006 |
| JP | 2007-187025 A | 7/2007 |
| JP | 2009-002206 A | 1/2009 |
| WO | WO-2008/113318 A2 | 9/2008 |

* cited by examiner

*Primary Examiner* — Javaid Nasri
(74) *Attorney, Agent, or Firm* — Gifford, Krass, Sprinkle, Anderson & Citkowski, P.C.

(57) ABSTRACT

A wind power generator includes a pillar fixed on a base, a nacelle platform disposed on an upper end portion of the pillar, a service crane provided at a side of the nacelle platform, a generator assembly coupled to the nacelle platform, a rotor hub rotatably coupled to the generator assembly, and a plurality of blades coupled to the rotor hub and rotating the rotor hub. The rotor hub is provided at an outer circumference of a front end thereof with a plurality of first pulleys for guiding a case from a winch installed on the ground.

11 Claims, 10 Drawing Sheets

WIND POWER GENERATOR

CROSS-REFERENCE TO RELATED APPLICATION

This application claims priority to and the benefit of Korean Patent Application No. 10-2009-0028984 filed in the Korean Intellectual Property Office on Apr. 3, 2009, the entire contents of which are incorporated herein by reference.

BACKGROUND OF THE INVENTION (a) Field of the Invention

The present invention relates to a wind power generator. More particularly, the present invention relates to a wind power generator that is designed in a large size and can be easily installed while providing convenient maintenance.

(b) Description of the Related Art

Generally, a wind power generator is installed at a mountainous area and the seaside considering characteristics of wind resources. Wind power generators are gradually becoming large-sized, and thus a large-sized hydro-crane of more than 100 tons is required to install large-sized wind power generators.

The large-sized crane has many limitations in carriage and installation. That is, since the crane used for installing the wind power generator is large-sized, when road conditions are not good it is difficult to move the crane.

Particularly, when the large-sized crane moves along mountainous areas, forests are damaged in the course of making a pathway for the crane. The time and costs for recovering the forests are large.

In addition, when the installed wind power generator fatally breaks down, there is a need to repair the wind power generator after disassemble thereof. At this point, since the large-sized crane should be transported through the mountainous area, the time and costs are additional incurred. Accordingly, the operational efficiency of the wind power generator is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wind power generator having advantages of being easily and safely maintained with less expense without the help of a large-sized crane.

The present invention provides a wind power generator that is configured to reduce installation and maintenance costs.

The present invention also provides a wind power generator that is configured to improve operation and generation efficiencies by reducing repairing time.

The present invention also provides a wind power generator that is environmentally friendly by minimizing forest damage that may occur during movement of a large-sized crane.

According to one exemplary embodiment, a wind power generator includes a pillar fixed on a base, a nacelle platform disposed on an upper end portion of the pillar, a service crane provided at a side of the nacelle platform, a generator assembly coupled to the nacelle platform, a rotor hub rotatably coupled to the generator assembly, and a plurality of blades coupled to the rotor hub and rotating the rotor hub. The rotor hub is provided at an outer circumference of a front end thereof with a plurality of first pulleys for guiding a case from a winch installed on the ground.

The rotor hub may be provided at a front end thereof with an aperture, and the first pulleys are coupled around the aperture.

The first pulleys may be arranged at the same angle as the blades.

There may be three first pulleys that are spaced apart from each other by 120°.

A plurality of second pulleys may be installed on the rotor hub and arranged with the same axes as the blades.

The rotor hub may be provided with a plurality of guides for guiding the cable.

The guides may be provided with rotating guide pins.

Third pulleys for supporting the cable extending from the service crane to the rotor hub may be provided on the generator assembly.

Fourth pulleys for guiding the cable extending from the winch may be installed on the nacelle platform.

A main crane boom may be installed on an upper end portion of the nacelle platform.

Fifth pulleys for guiding the cable extending from the winch may be installed on the main crane boom.

The fifth pulleys may include a front pulley installed on a front end portion of the main crane boom, a middle pulley installed on a middle portion of the main crane boom, and a rear pulley installed on a rear end portion of the main crane boom.

According to the exemplary embodiment, since no large-sized crane is required, the major components of the wind power generator can be easily and safely repaired without damaging the forests even when the wind power generator is installed at a mountainous area.

In addition, since no large sized crane is required for installing or repairing the wind power generator, the installation and repairing of the wind power generator can be easily and quickly done and thus the operation rate and power generation efficiency can be improved.

Further, since no large-sized crane that may damage the forests in the course of making a pathway for the crane is required, the wind power generator of the present invention is eco-friendly.

DETAILED DESCRIPTION OF THE EMBODIMENTS

Figure 1:
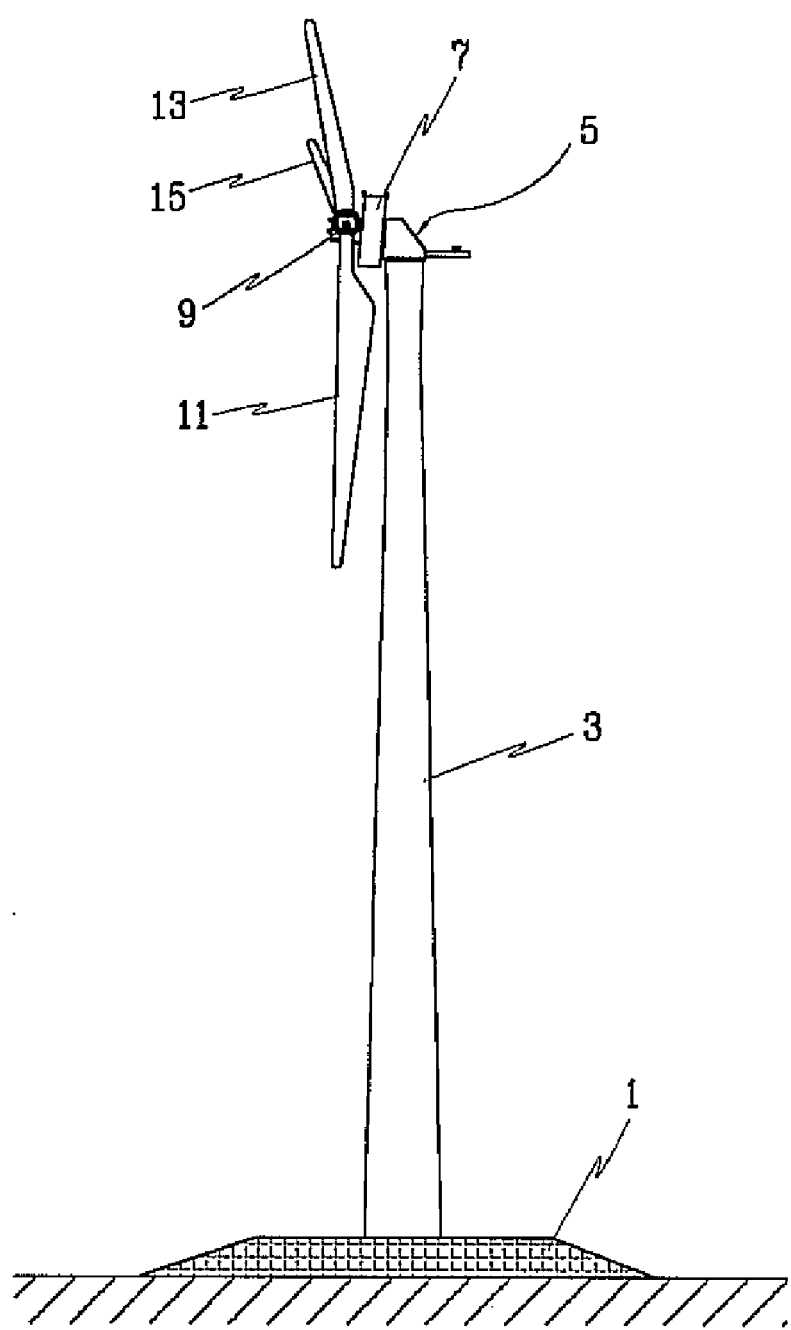
FIG. 1 is a schematic view of a wind power generator according to an exemplary embodiment of the present invention.

Hereinafter, referring to the drawings, the present invention will be described with reference to exemplary embodiments.

FIG. 1 is a schematic view of a wind power generator according to an exemplary embodiment of the present invention. Referring to FIG. 1, a wind power generator includes a base 1 installed on the ground, a pillar 3 fixedly erected on the base 1, a nacelle platform 5 disposed on the pillar 3, a generator assembly 7 coupled to the nacelle platform 5, a rotor hub 9 coupled to the generator assembly 7, and a plurality of blades 11, 13, and 15 coupled to the rotor hub 9.

The base 1 is formed by casting concrete on the ground to securely fix the pillar 3. The pillar 3 generally exceeds tens of meters in height. The pillar 3 may be formed of concrete or metal.

Figure 2:
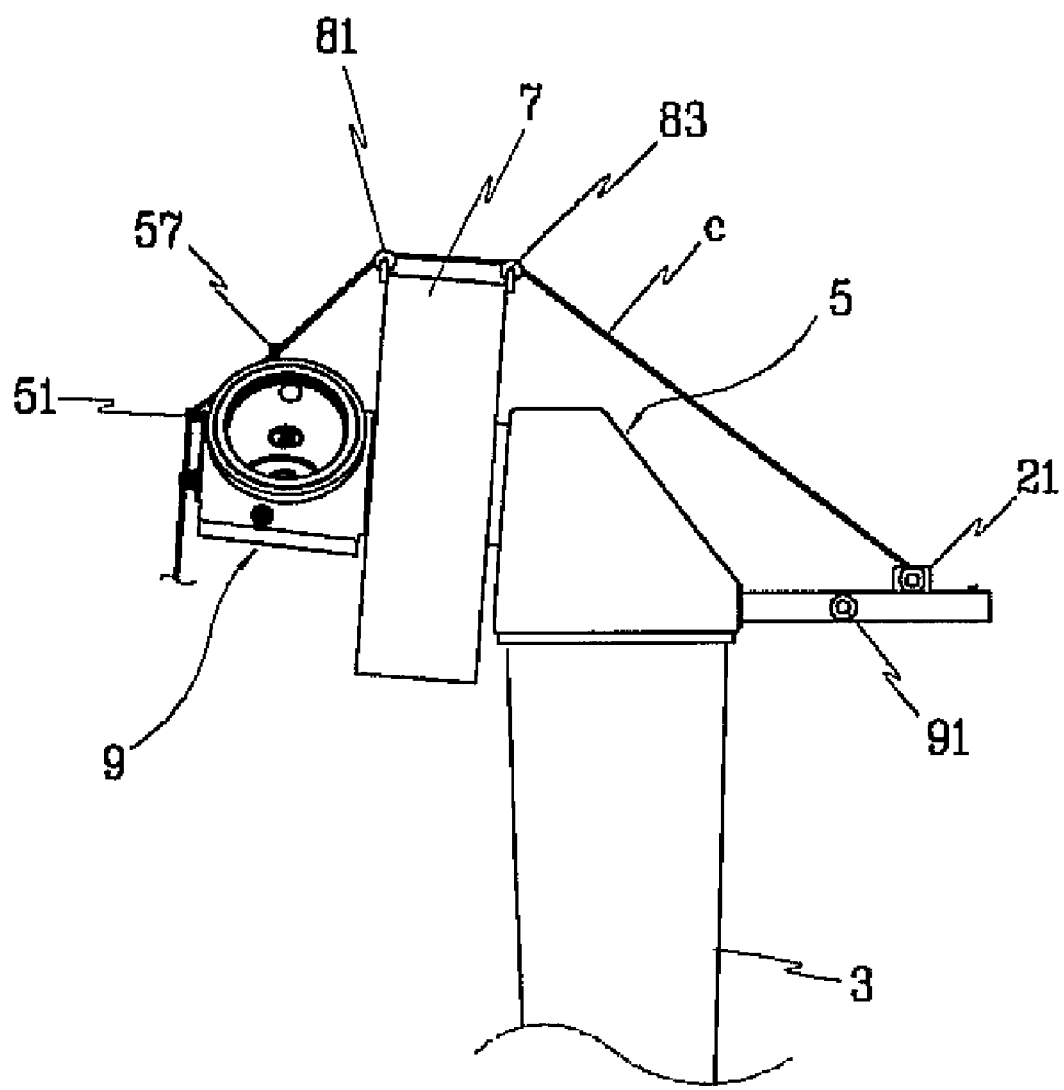
FIG. 2 is a detailed view of a major portion of FIG. 1.

The nacelle platform 5 is installed at an upper end portion of the pillar 3. Components required for power generation are disposed in the nacelle platform 5. As shown in FIG. 2, the nacelle platform 5 is provided at a side thereof with a service crane 21. The service crane 21 is used to take small components disposed in the nacelle platform 5 down to the ground or up from the ground. The service crane 21 may be installed when the wind power generator is initially set up.

The generator assembly 7 is coupled to the nacelle platform 5 by coupling members. The generator assembly 7 may be enclosed by a case, and devices required for power generation may be disposed in the generator assembly 7.

The rotor hub 9 is rotatably coupled to the generator assembly 7. The rotor hub 9 is coupled to the blades 11, 13, and 15 (there are generally three blades). However, the present invention is not limited to this. For example, more than or less than three blades may be used.

Figure 3:
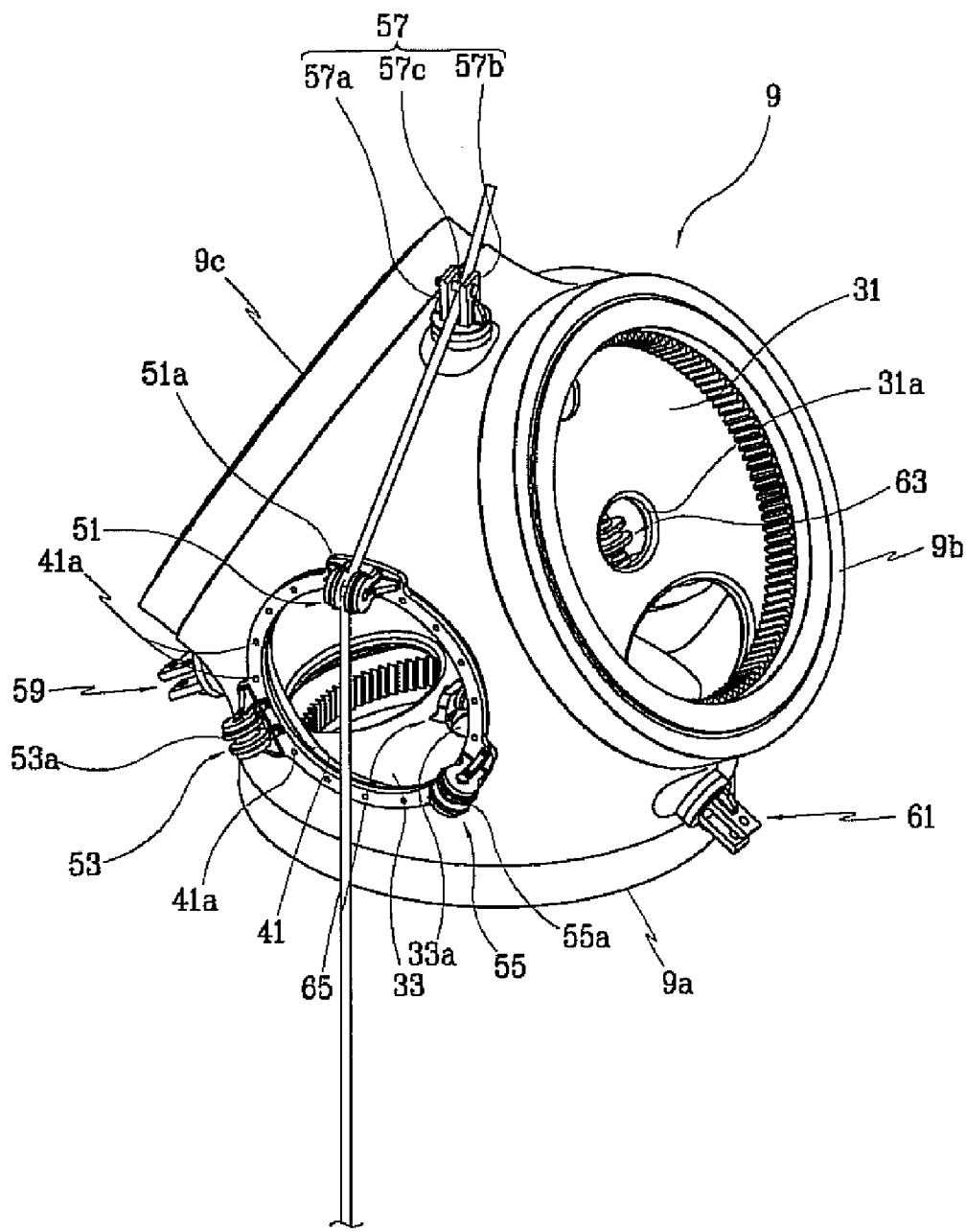
FIG. 3 is a detailed view of a rotor hub of FIG. 1.
Figure 4:
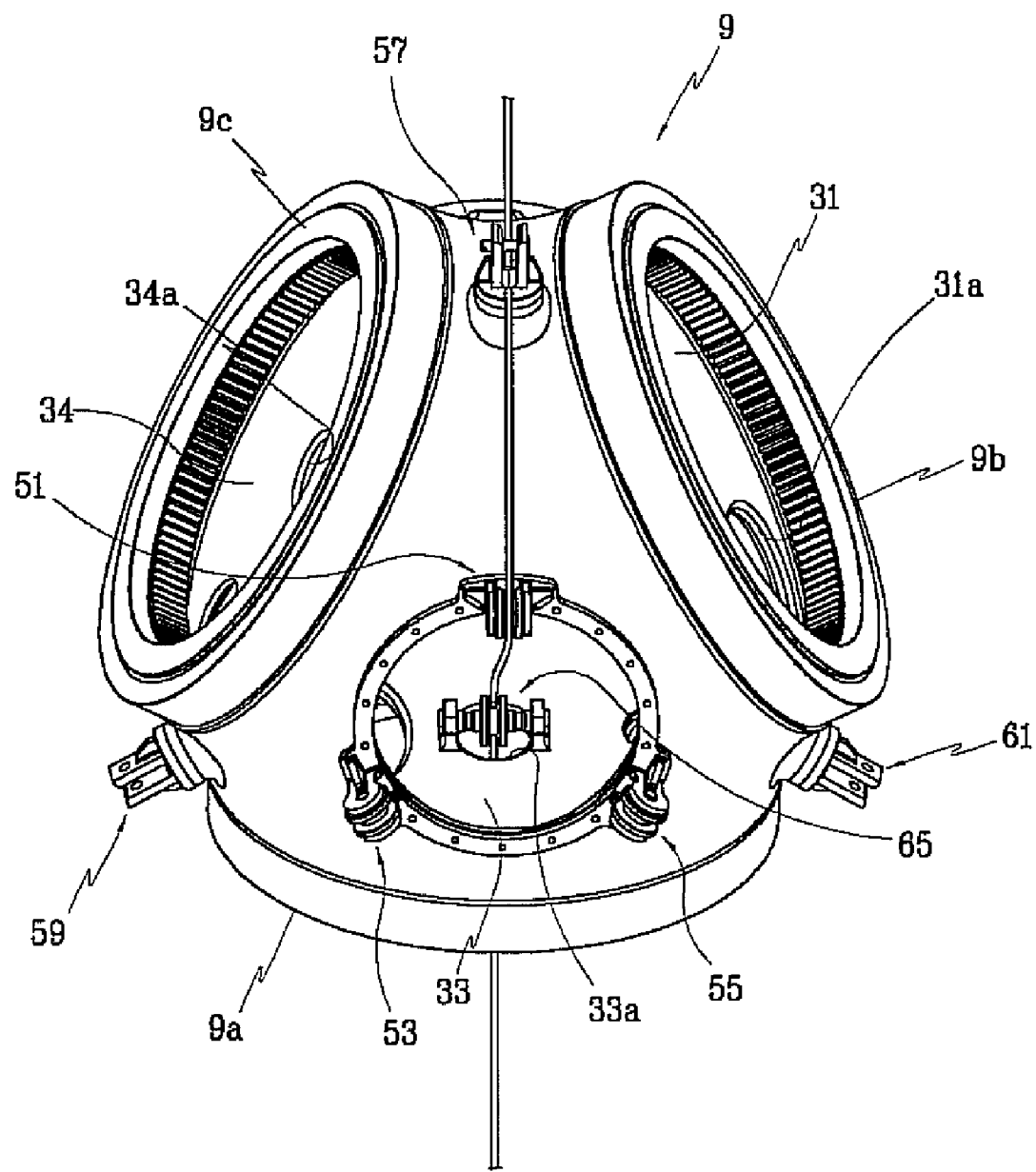
FIG. 4 is a view of the rotor hub of FIG. 3 from a different angle.

FIGS. 3 and 4 show the rotor hub 9 illustrated at different angles. The rotor hub 9 is provided with a plurality of blade coupling portions 9a, 9b, and 9c. When three blade coupling portions 9a, 9b, and 9c are provided, they are spaced apart from each other at an angle of 120°.

The blade coupling portions 9a, 9b, and 9cs are provided at insides thereof with separating portions 31, 33, and 34 (see FIGS. 3 and 4) by which inner and outer spaces are separated from each other, respectively. The separating portions 31, 33, and 34 are provided at middle portions thereof with apertures 31a, 33a, and 34a (see FIGS. 3 and 4) corresponding to lengthwise axes of the blades 11, 13, and 15, respectively.

The rotor hub 9 is provided at a front end portion thereof with a through hole 41. A plurality of coupling holes 41a are provided around the through holes 41. First pulleys 51, 53, and 55 are coupled to the coupling holes 41a by coupling members such as bolts.

The first pulleys 51, 53, and 55 may be disposed at an outer circumference of the rotor hub 9. The first pulleys 51, 53, and 55 function to guide a cable connected to the service crane 21 or a winch W (see FIG. 5) installed on the ground. When three pulleys 51, 53, and 55 are provided, they are spaced apart from each other at an angle of 120° in a circle (see FIG. 4). The first pulleys 51, 53, and 55 may be disposed such that rollers 51a, 53a, and 55a rotate in a length direction of the respective blades 11, 13, and 15.

Meanwhile, the rotor hub 9 is provided at an outer circumference thereof with guides 57, 59, and 61 for guiding the cables directed to the first pulleys 51, 53, and 55. The guides 57, 59, and 61 may be disposed to correspond to the first pulleys 51, 53, and 55, respectively. That is, the guides 57, 59, and 61 may be disposed to correspond to the respective first pulleys 51, 53, and 55 in respective lines.

One guide 57 among the guides 57, 59, and 61 is selected to describe a structure thereof in detail. The following will describe the structure of the guides 57, 59, and 61.

The guide 57 includes walls 57a and 57b spaced apart from each other by a predetermined distance. A guide pin 57c is provided on the walls 57a and 57b. The guide pin 57c may be rotatably coupled to the walls 57a and 57b. By rotatably disposing the guide pin 57c on the walls 57a and 57b, the cable C (see FIG. 5) connected to the winch W (see FIG. 5) installed on the ground can be smoothly guided to the first pulley 51.

Since the guides 59 and 61 have the same structure as the guide 57, the detailed description thereof will be omitted herein.

Second pulleys 63 and 65 (only two are shown in FIG. 3) are provided in the rotor hub 9. The second pulleys 63 and 65 are disposed on the same axes as the length direction of the blades 11, 13, and 15. The number of the second pulleys 63 and 65 may be same as that of the blades 11, 13, and 15.

The second pulleys 63 and 65 guide a cable connected to the winch W installed on the ground to take the blades 11, 13, and 15 when they are disassembled down to the ground or up from the ground to couple the blades 11, 13, and 15 to the rotor hub 9.

Meanwhile, third pulleys 81 and 83 (only two are shown in FIG. 2) supporting the cable C extending from the service crane 21 to the rotor hub 9 are provided on the generator assembly 7. The third pulleys 81 and 83 may be provided on an upper corner of the case defining an outer appearance of the generator assembly 7. That is, two third pulleys may be installed on a front-upper corner and a rear-upper corner, respectively.

In additional, a fourth pulley 91 is installed on the nacelle platform 5 connected to the winch W installed on the ground. The fourth pulley 91 guides the cable connected to the winch W to take the blades 11, 13, and 15, the rotor hub 9, and the generator assembly 7 down to the ground or up to assemble the same.

Figure 6:
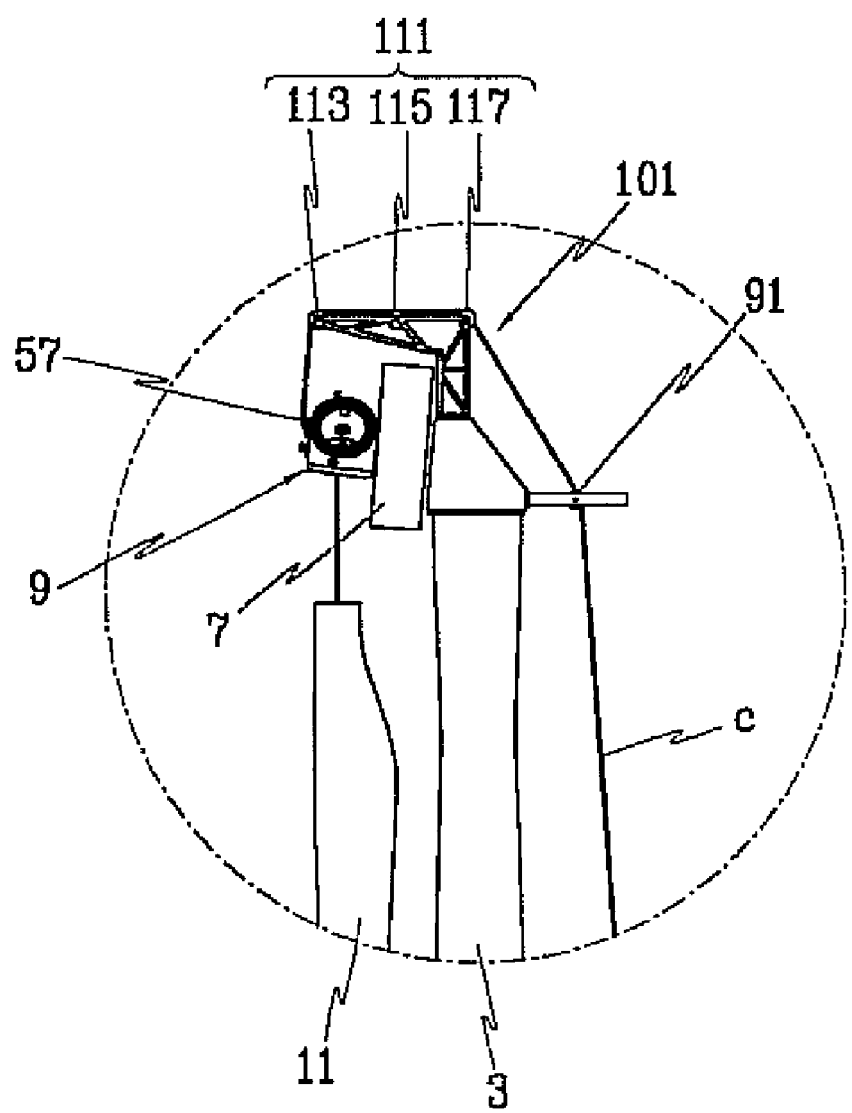
FIG. 6 is an enlarged view of a portion A of FIG. 5.

As shown in FIG. 6, a main crane boom 101 may be installed on an upper portion of the nacelle platform 5. The main crane boom 101 may be assembled to or dissembled from the nacelle platform 5 as necessary.

Fifth pulleys 111 are installed on the main crane boom 101 to guide the cable connected to the winch W. The fifth pulleys 111 include a front pulley 113 installed at a front end portion of the main crane boom 101, a middle pulley 115 installed at a middle portion of the main crane boom 101, and a rear pulley 117 installed at a rear end portion of the main crane boom 101.

The first pulleys 51, 53, and 55, the second pulleys 63 and 65, the third pulleys 81 and 83, the fourth pulley 91, and the fifth pulleys 111 may be formed in a conventional structure.

The following will describe a process for disassembling and assembling the blades 11, 13, and 15, the rotor hub 9, and the generator assembly 7 according to one embodiment.

First, as shown in FIG. 2, the cable C is first connected to the service crane 21 installed on the nacelle platform 5. The cable C moved by the service crane 21 is guided by the third pulleys 81 and 83. The cable C is further guided by the guide 57 and the first pulleys 51.

Accordingly, the service crane 21 takes up components of the main crane boom 101 that will be installed on the nacelle platform 5 by moving the cable C. In addition, a worker assembles the main crane boom 101 on the upper portion of the nacelle platform 5 using the components.

Needless to say, the simple components may be taken down or up by the service crane 21, the first pulley 57, and the third pulleys 81 and 83.

The following will describe a process for disassembling the blades 11, 13, and 15 and taking the same down to the ground in a state in which the main crane boom 101 is installed as described above.

Figure 5:
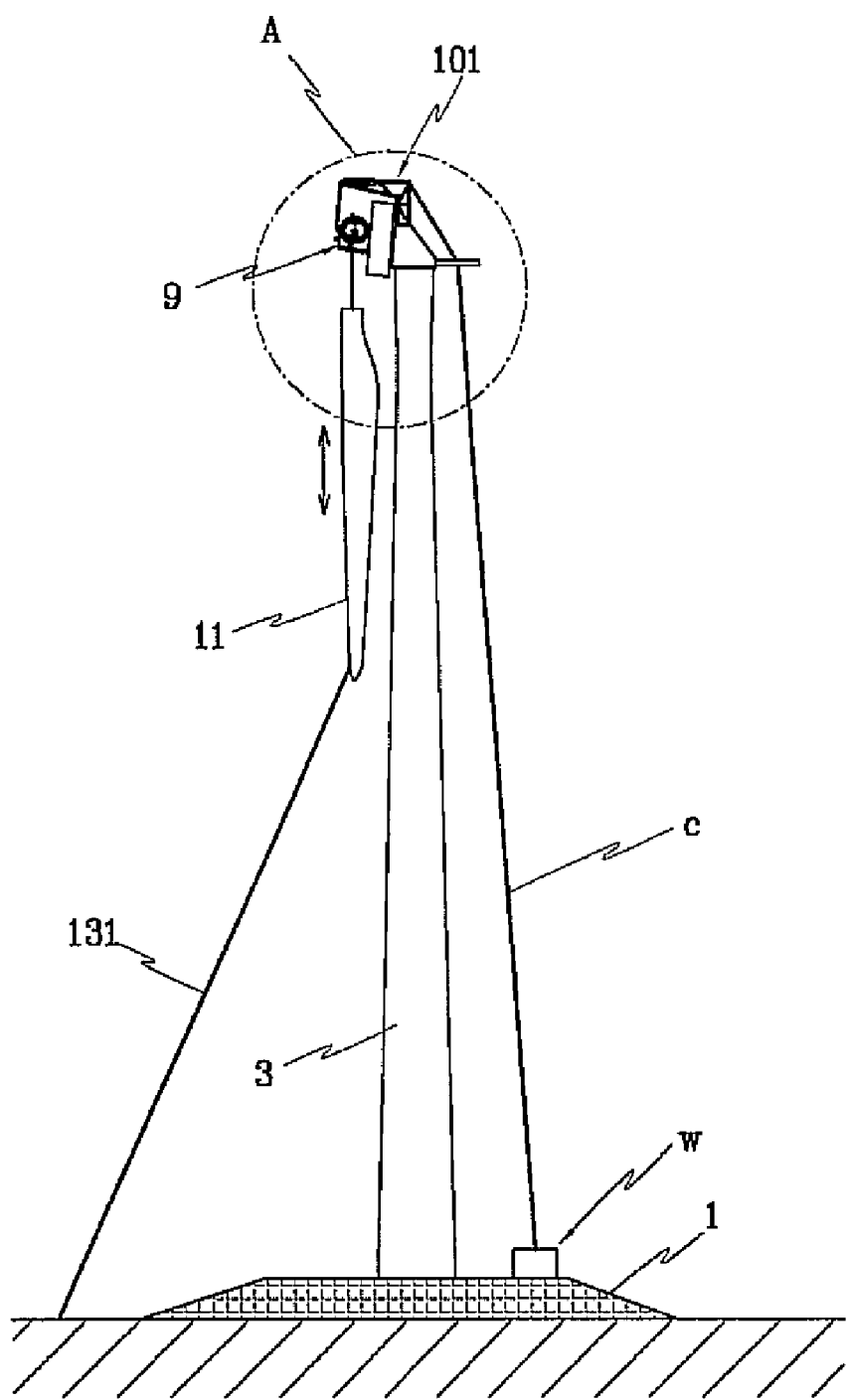
FIG. 5 is a view illustrating a process for disassembling and lowering a blade to the ground according to one exemplary embodiment.

FIGS. 5 and 6 are views illustrating a process for disassembling the blades and taking the same down to the ground for repairing the same.

First, the cable C moving by the winch W sequentially close-contacts the first pulley 91, the rear pulley 117, the front pulley 113, the first pulley 57, and one of the second pulleys (63). In addition, the cable C is disposed to pass through one of the apertures (e.g., the aperture 33*a*) formed through the rotor hub 9.

Accordingly, the blade 11 is fixed on a front end of the cable C and the cable C moves by the winch W installed on the ground. At this point, in order to prevent the tip of the blade 11 from colliding with the ground, a pulling wire may be connected to the blade 11 to pull the blade.

In order to fix the blade 11 that is repaired on the ground on the rotor hub 9, the blade 11 is taken up. In this case, the winch W is used in the same manner as described above.

Figure 7:
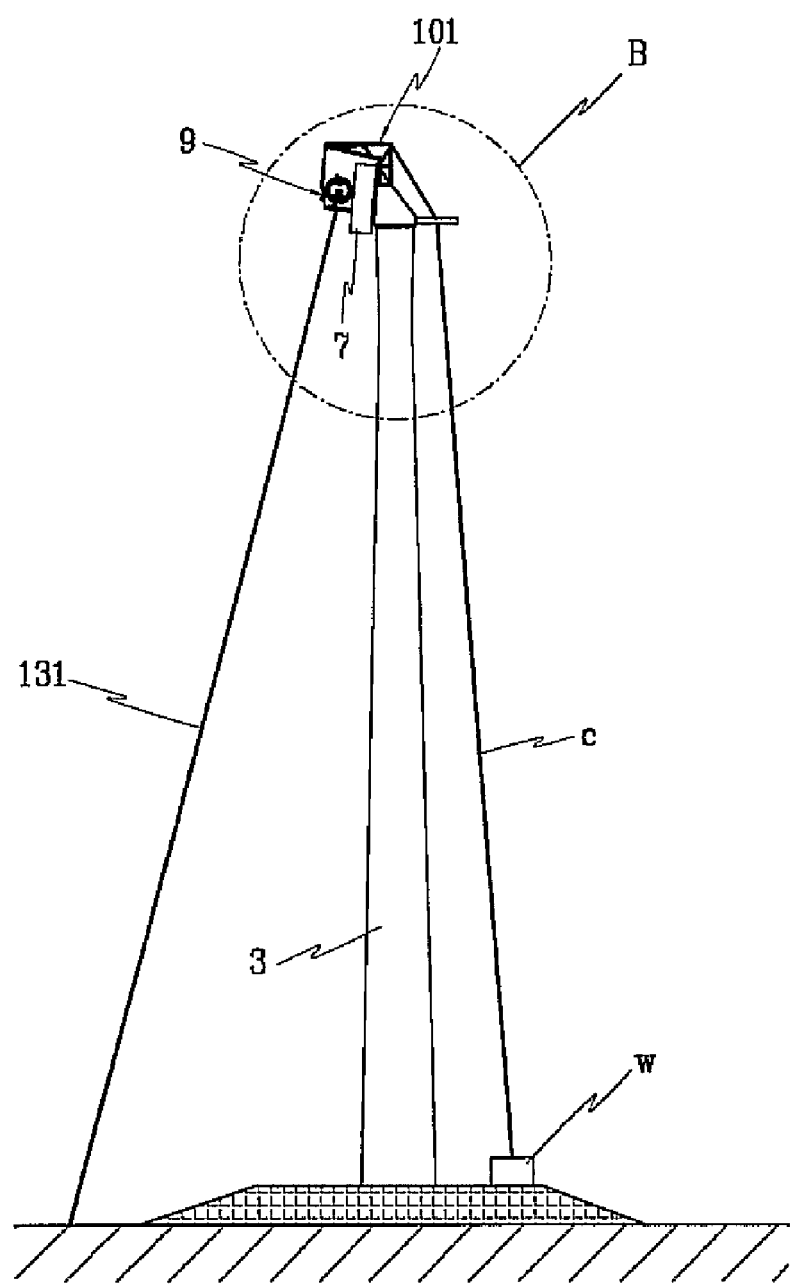
FIG. 7 is a view illustrating a process for disassembling a rotor hub and lowering the same to the ground according to one exemplary embodiment.
Figure 8:
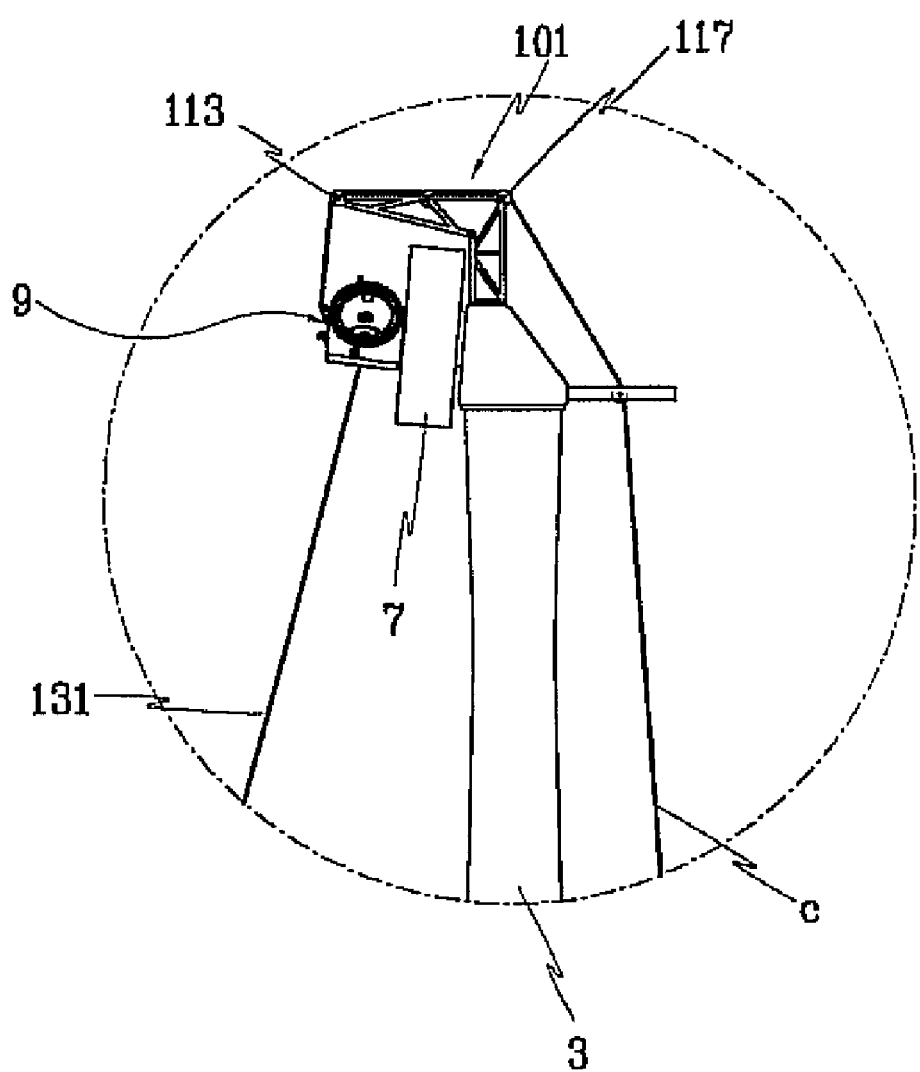
FIG. 8 is an enlarged view of a portion B of FIG. 7.

After the blades 11, 13, and 15 are disassembled and taken down to the ground as described above, the rotor hub 9 is taken down to the ground. This will be described hereinafter with reference to FIGS. 7 and 8.

First, the cable C moving by the winch W installed on the ground is disposed as described above. At this point, since the rotor hub 9 is the object that will be taken down to the ground, the front end of the cable C passing through the front pulley 113 is fixed to the rotor hub 9. Further, a pulling wire 131 is connected to the rotor hub 9. The worker pulls the rotor hub 9 using the pulling wire 131 to prevent the rotor hub 9 from colliding with the pillar, in the course of which the worker moves the cable C using the winch W installed on the ground.

When the cable C moves as described above, the rotor hub 9 can be easily taken down to the ground or up from the ground.

Figure 9:
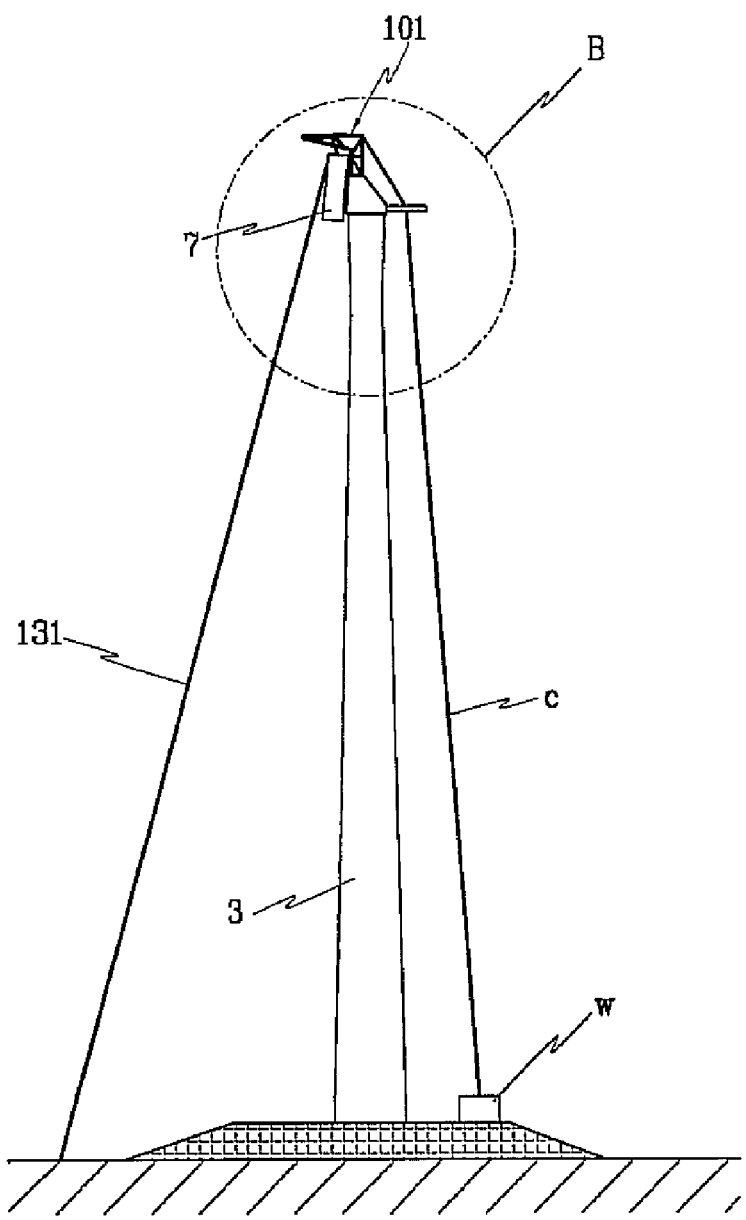
FIG. 9 is a view illustrating a process for disassembling a generator assembly and lowering the same to the ground according to one exemplary embodiment.
Figure 10:
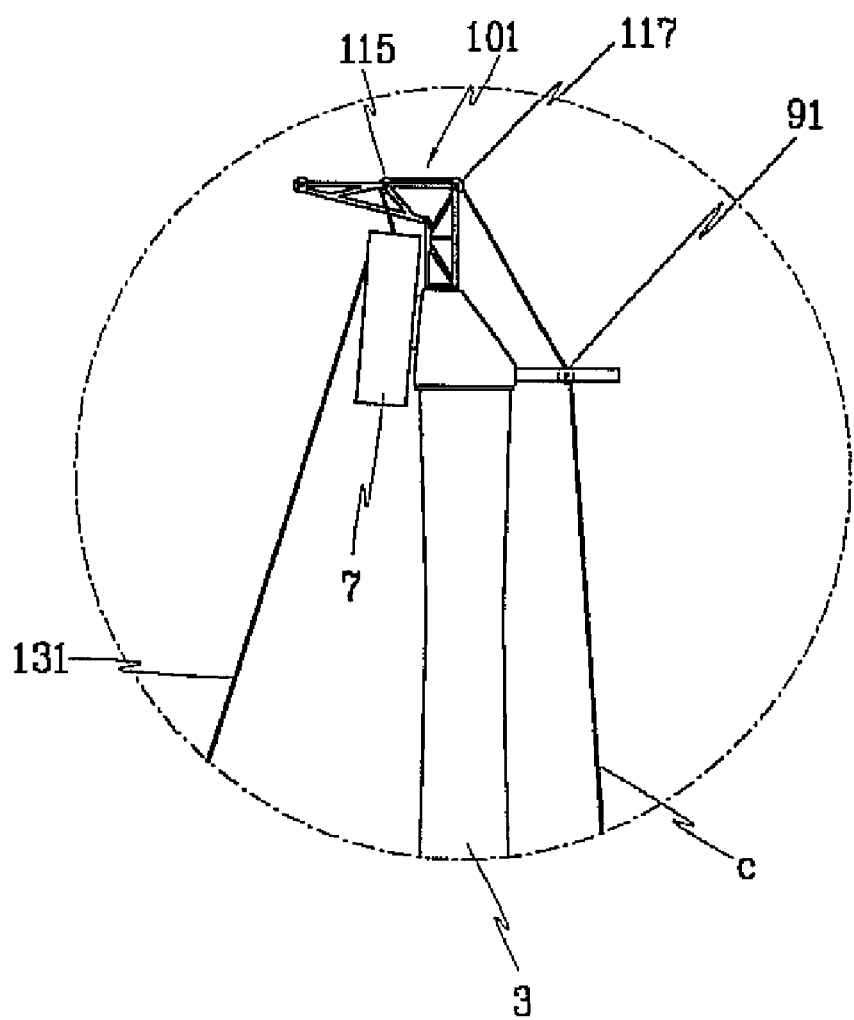
FIG. 10 is an enlarged view of a portion C of FIG. 9.

The following will describe a process for taking the generator assembly 7 down to the ground with reference to FIGS. 9 and 10.

First, the cable C moving by the winch W installed on the ground is connected to be guided by the fourth pulley 91, the rear pulley 117, and the middle pulley 115, and the front end of the wire W is fixed on the generator assembly 7 (see FIG. 9).

After the above, the generator assembly 7 is separated from the nacelle platform 5. By moving the cable C using the winch W installed on the ground, the generator assembly 7 can be taken down to the ground. Needless to say, in order to prevent the generator assembly 7 from colliding with the pillar 3, the worker connects the pulling wire 131 to the generator assembly 7 to pull the generator assembly 7 while the generator assembly is being taken down to the ground.

After repairing the rotor hub 9 and the generator assembly 7 on the ground, they are assembled again through the above-described processes.

According to the exemplary embodiments, there is no need to use a large-sized hydro crane to set up or repair the wind power generator. That is, according to the exemplary embodiments, the wind power generator has the main crane boom that can take the blades, rotor hub, generator assembly, and the like down to the ground or up from the ground. Further, if necessary, the main crane boom may be disassembled from the wind power generator.

Accordingly, the installation and maintenance costs of the wind power generator can be reduced while the operation rate and power generating efficiency are improved.

Particularly, since no large-sized crane that may damage forests in the course of making a pathway for the crane is required, the wind power generator of the present invention is eco-friendly.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A wind power generator comprising:
   a pillar fixed on a base;
   a nacelle platform disposed on an upper end portion of the pillar;
   a service crane provided at a side of the nacelle platform;
   a generator assembly coupled to the nacelle platform;
   a rotor hub rotatably coupled to the generator assembly; and
   a plurality of blades coupled to the rotor hub and rotating the rotor hub,
   wherein the rotor hub is provided at an outer circumference of a front end thereof with a plurality of first pulleys for guiding a cable from a winch installed on a ground,
   wherein there are three first pulleys that are spaced apart from each other by 120° in a circle.

2. A wind power generator of claim 1, wherein the rotor hub is provided at a front end thereof with a through hole, and the first pulleys are coupled around the through hole.

3. The wind power generator of claim 1, wherein the first pulleys are arranged at the same angle as the blades.

4. The wind power generator of claim 1, wherein a plurality of second pulleys are installed on the rotor hub and arranged with the same axes as the blades.

5. The wind power generator of claim 1, wherein the rotor hub is provided with a plurality of guides for guiding the cable.

6. The wind power generator of claim 5, wherein the guides are provided with rotating guide pins.

7. The wind power generator of claim 1, wherein third pulleys for supporting the cable extending from the service crane to the rotor hub are provided on the generator assembly.

8. The wind power generator of claim 1, wherein a fourth pulley for guiding the cable extending from the winch is installed on the nacelle platform.

9. The wind power generator of claim 1, wherein a main crane boom is installed on an upper end portion of the nacelle platform.

10. The wind power generator of claim 9, wherein fifth pulleys for guiding the cable extending from the winch are installed on the main crane boom.

11. The wind power generator of claim 10, wherein the fifth pulleys comprise a front pulley installed on a front end portion of the main crane boom, a middle pulley installed on a middle portion of the main crane boom, and a rear pulley installed on a rear end portion of the main crane boom.

* * * * *